I. B. SMITH.
OPTICAL PYROMETRY.
APPLICATION FILED APR. 8, 1919.
1,319,805.
Patented Oct. 28, 1919.
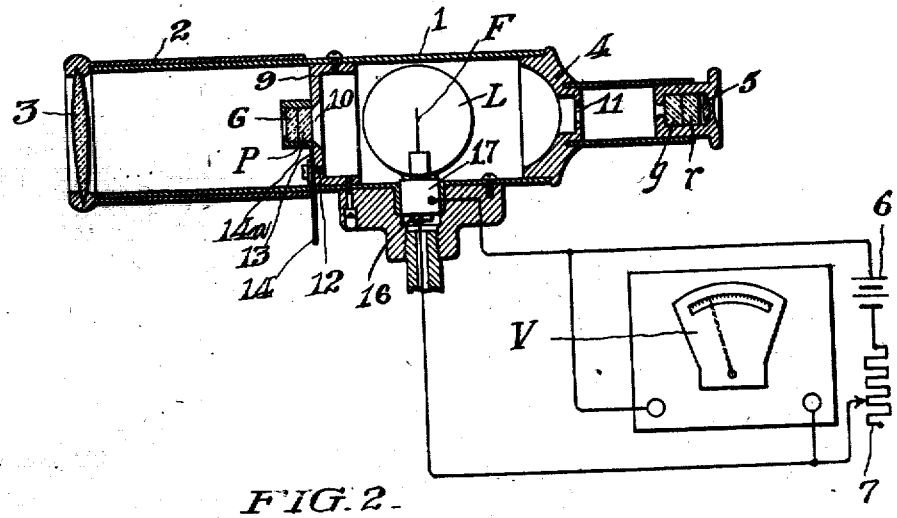
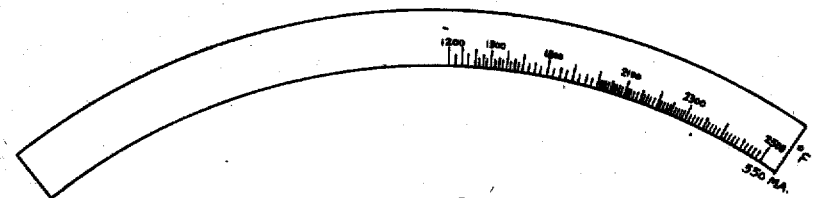
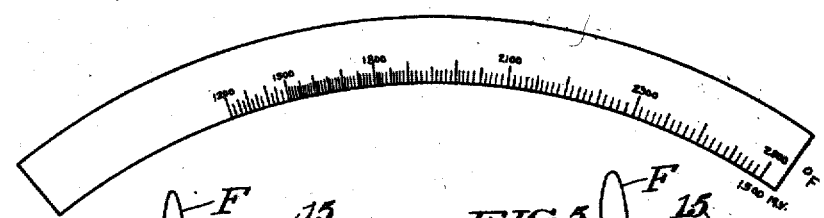
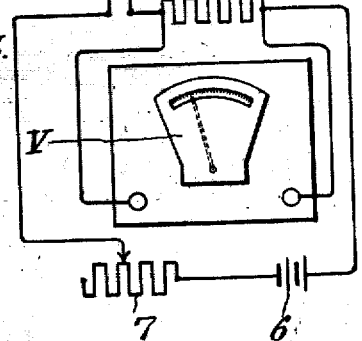
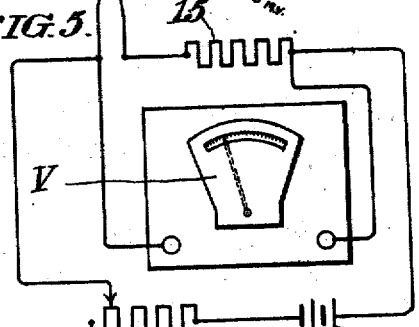
INVENTOR
Irving B. Smith
BY Cornelius D. Ehret
his ATTORNEY.

UNITED STATES PATENT OFFICE.

IRVING B. SMITH, OF AMBLER, PENNSYLVANIA, ASSIGNOR TO LEEDS & NORTHRUP COMPANY, OF PHILADELPHIA, PENNSYLVANIA, A CORPORATION OF PENNSYLVANIA.

OPTICAL PYROMETRY.

1,319,805.  Specification of Letters Patent.  Patented Oct. 28, 1919.

Application filed April 8, 1919. Serial No. 288,479.

*To all whom it may concern:*

Be it known that I, IRVING B. SMITH, a citizen of the United States, residing in Ambler, State of Pennsylvania, have invented certain new and useful Improvements in Optical Pyrometry, of which the following is a specification.

My invention relates to optical pyrometry wherein an electric current passed through a light standard, as an incandescent lamp, is varied until the brightness of that standard matches the brightness of the incandescent body whose temperature is to be determined.

In optical pyrometry of the character referred to it has been customary to measure the current passed through the lamp standard by a D'Arsonval or other suitable galvanometer calibrated in units of temperature or units of current, as milliamperes, the galvanometer being connected in series with the light standard or incandescent filament. With such an arrangement the useful part of the scale of the instrument is comparatively short or cramped.

I have found that while such a mode of connection of the measuring instrument or galvanometer may be suitable for an incandescent lamp filament of carbon or other material of negative temperature coefficient, when tungsten or other filaments having positive temperature coefficient are employed, a far better instrument scale is available if the galvanometer be not employed in an ammeter or series relation, but be employed in a voltmeter or shunt relation. By employing the galvanometer as a voltmeter or millivoltmeter connected in shunt to the tungsten or other lamp filament having positive temperature coefficient or in other analogous arrangement, an extended scale is procurable which obviously is an advantage in making readings, as of temperature, because an extended or longer scale can be read with correspondingly greater degree of refinement and accuracy.

My invention will be understood to reside therefore in an arrangement of the character referred to wherein the galvanometer is employed as a voltmeter connected in shunt to the lamp filament, or in analogous relation.

For an illustration of some of the various forms my invention may take, reference is to be had to the accompanying drawing, in which:

Figure 1 is in part a cross sectional view of optical pyrometric apparatus and in part a diagrammatic view of circuit arrangement.

Fig. 2 is an illustration of the scale of a galvanometer employed in the series or current measuring relation.

Fig. 3 is an illustration of a scale resulting from my new mode of connection.

Fig. 4 is a diagrammatic view of modified circuit arrangement coming within my invention.

Fig. 5 is a diagrammatic view of a further modification of circuit arrangement coming within my invention.

Referring to Fig. 1, 1 is a tube upon which telescopes the tube 2 having at its front end the objective lens 3. The tube 1 is closed at its rear end by the member 4 supporting the eye piece structure having the ocular lens 5 in front of which are disposed suitable glass screens $r$ and $g$ of red or other suitably colored glass. Suitably disposed within the tube 1 is the incandescent lamp L having the filament F whose terminals, respectively, are connected to the lamp base terminals 16 and 17, to which are connected, preferably by soldering, conductors constituting leads of low or suitable resistance connecting to the terminals of the galvanometer V. The lamp filament F is in series with the battery or source of current 6 and the variable resistance or rheostat 7.

Between the lamp L and the objective 3 is disposed the member or diaphragm 9 having the aperture 10 in the optical axis of the instrument, in which axis is also the aperture 11 adjacent the eye piece structure.

Upon the member 9 is pivoted at 12 the lever 13 having a handle 14 extending to the exterior of the telescope structure. At its inner end the lever 13 carries the holder 14ᵃ, in which are disposed absorption screen elements of any suitable character, as G and P.

Assuming the absorption screen structure G, P shifted to one side of the optical axis of the instrument, and further assuming the instrument V to be a milliammeter connected in series with the lamp filament F, as in former practice, the instrument would be employed as follows:

The telescope is sighted upon the incandescent body whose temperature is to be measured and the rheostat 7 adjusted until the brightness of the filament F as viewed through the eye piece matches the brightness of the incandescent body. A reading of the milliammeter is then taken either in milliamperes or directly in temperatures on a scale of the character indicated in Fig. 2. This scale, graduated in temperatures ranging from 1200 to 2500 degrees Fahrenheit, usually the range for the filament F., will be seen to be relatively short when considering the entire arcuate length of the scale which corresponds to the available deflection of a D'Arsonval galvanometer.

By connecting the galvanometer as a voltmeter V, as in Fig. 1, in shunt to the tungsten or other filament F of positive temperature co-efficient, a scale of the character shown in Fig. 3 is available for the same range of temperatures. In connection with both scales, Figs. 2 and 3, the same galvanometer and same filament F are assumed. For a temperature of 2500 degrees, Fig. 2 550 milliamperes, for example, flow through the moving coil of the instrument. In the case of Fig. 3, however, at 2500 degrees Fahrenheit, the fall of potential across the same filament F is for example, 1500 millivolts, corresponding with the same current strength through the movable coil of the same galvanometer or another galvanometer having the same constant.

It is readily observable that the scale of Fig. 3 is the more desirable of the two, being materially longer than the scale of Fig. 2 for the same range of temperatures. Fig. 3 is a scale which is more open or extended than the scale of Fig. 2 and is more readily utilizable for greater refinement and accuracy in readings.

A scale of the character of Fig. 3 is available when the lamp filament F is of tungsten or other metal or material having a suitably high positive temperature coefficient, for in such case the voltage drop across its terminals rises more rapidly than the current strength therethrough.

It will be understood that a pyrometer of the character referred to with the voltmeter connection described may have a second range scale, as well understood in the art, when an absorption screen structure, as G, P, is in position indicated in Fig. 1 for absorbing some of the light transmitted from the incandescent body whose temperature is to be measured. But such second or high range scale will have the same general characteristics as the scale of Fig. 3 referred to, because the lamp filament temperature and currents are of a range the same as in the case where the absorption screen is absent.

While the mode of connection shown in Fig. 1 is my preferred arrangement, namely, the voltmeter connected directly across the terminals of the lamp filament, an arrangement such as shown in Fig. 4 may be employed wherein 15 is a resistance in series with a lamp filament F of any suitable character, such resistance 15 having any suitable structure or nature, but having a substantial or high positive temperature coefficient. In fact, the resistance 15 may be a lamp filament of tungsten or other suitable material, or a fine iron wire inclosed in a non-oxidizing atmosphere or vacuum. In this case, the same current traversing the filament F traverses the resistance 15, which will be so heated by the current that its resistance rises quite rapidly, so giving a fall of potential at its terminals, so measured by voltmeter V that a scale of a similarly open or extended character of Fig. 3 is obtainable.

In Fig. 5 the resistance 15, which may be of the same character as described in connection with Fig. 4, is again in series with a lamp filament F, but the voltmeter V is connected both in shunt to the lamp filament F and resistance 15. Here again a scale of the general character of Fig. 3 is obtainable.

What I claim is:

1. Optical pyrometric apparatus comprising a circuit including a light standard, a source of current therefor, means for varying the current in said light standard, a part of said circuit having a positive temperature coefficient, whereby the potential drop across said part increases at a rate greater than the rate of increase of current in said light standard, and a galvanometer employed as a voltmeter connected in shunt to said part of said circuit having a positive temperature coefficient.

2. Optical pyrometric apparatus comprising a circuit including a light standard, a source of current therefor, means for varying the current in said light standard, a part of said circuit having a positive temperature coefficient, whereby the potential drop across said part increases at a rate greater than the rate of increase of current in said light standard, a galvanometer employed as a voltmeter connected in shunt to said part of said circuit having a positive temperature coefficient, and a scale for said galvanometer graduated in temperature units and having a total extent greater than the corresponding scale of the galvanometer employed in ammeter relation.

3. Optical pyrometric apparatus comprising a circuit including an incandescing member having a positive temperature coefficient, a source of current therefor, means for varying the current strength in said member, and a galvanometer employed as a voltmeter connected in shunt to said member.

4. Optical pyrometric apparatus comprising a circuit including a tungsten filament, a source of current therefor and means for varying the current strength in said filament, a galvanometer connected in shunt to a part of said circuit including said filament, said part of said circuit having as a whole a positive temperature coefficient, and a scale for said galvanometer graduated in temperature units.

5. Pyrometric apparatus comprising a circuit including a lamp filament having a positive temperature coefficient, a source of current therefor and means for varying the current through said filament, a galvanometer employed as a voltmeter connected in shunt to a part of the entire resistance of said circuit having a positive temperature coefficient, and a scale for said galvanometer calibrated in temperature units.

6. Optical pyrometric apparatus comprising a circuit including a lamp filament having a positive temperature coefficient, a source of current and means for varying the current in said lamp filament, a galvanometer connected in shunt to a part of said circuit including said lamp filament, and a scale for said galvanometer calibrated in temperature units.

7. Optical pyrometric apparatus comprising a circuit including a lamp filament having a positive temperature coefficient, a source of current and means for varying the current in said filament, and a galvanometer connected in shunt to said lamp filament.

8. Optical pyrometric apparatus comprising a circuit including a lamp filament having a positive temperature coefficient, a source of current and means for varying the current in said filament, a galvanometer connected in shunt to said lamp filament, and a scale for said galvanometer calibrated in temperature units.

9. Pyrometric apparatus comprising a circuit including a metal lamp filament, a source of current and means for varying the current in said filament, and a D'Arsonval galvanometer having a scale calibrated in temperature units connected in shunt to said filament.

In testimony whereof I have hereunto affixed my signature this 7th day of April, 1919.

IRVING B. SMITH.